UNITED STATES PATENT OFFICE.

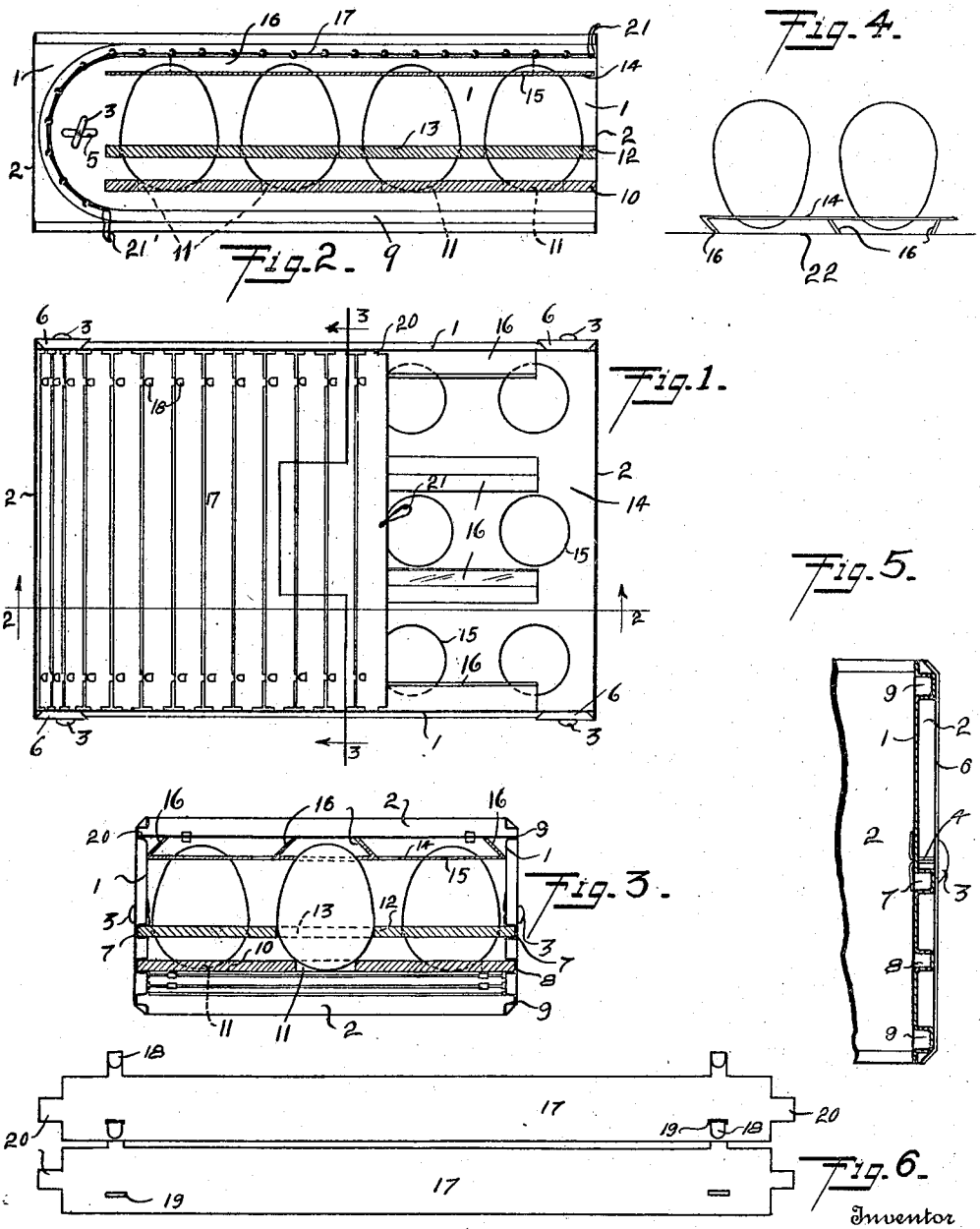
E. E. YOHO.
EGG BOX.
APPLICATION FILED FEB. 9, 1914.
1,199,853. Patented Oct. 3, 1916.

ELMER E. YOHO, OF LINCOLN, NEBRASKA, ASSIGNOR, BY MESNE ASSIGNMENTS, TO NATIONAL EGG CARRIER COMPANY.

EGG-BOX.

1,199,853.  Specification of Letters Patent.  Patented Oct. 3, 1916.

Application filed February 9, 1914. Serial No. 817,681.

*To all whom it may concern:*

Be it known that I, ELMER E. YOHO, a citizen of the United States, residing in the city of Lincoln, county of Lancaster, and State of Nebraska, have invented certain new and useful Improvements in Egg-Boxes, and have described the same in the following specification, illustrated by the accompanying drawings.

The invention appertains to that class of egg boxes wherein means are provided for sustaining eggs in spaced relation and guarding them against breakage, and the essential object in view is the production of a construction which shall be at once simple, cheap and efficient.

A more detail object in view is the elimination of the commonly used partitions and the adaptation of cushioning means for both sustaining the eggs in their relative relation and protecting them against injury.

A still further object in view is the provision of supporting means in combination with a sliding cover and a cushion disposed between the cover and supporting means for effecting maintenance of the eggs in their proper relation while, at the same time, guarding them against injury.

With these and further objects in view, as will, in part, hereinafter be specified and in part become apparent, the invention comprises certain novel constructions, combinations, and arrangements of parts as will hereinafter be specified and claimed.

In the accompanying drawing, Figure 1 is a plan view of an egg box or crate embodying the features of the present invention, the cover being slid part-way toward its open position. Fig. 2 is a longitudinal vertical section taken therethrough on the plane indicated by line 2—2 of Fig. 1, the lid being shown in its closed position. Fig. 3 is a transverse vertical section taken on the plane indicated by line 3—3 of Fig. 1. Fig. 4 is a detail view showing a fragment of the cushion tray removed from the box and serving as a support for the eggs. Fig. 5 is a fragmentary view showing one side and a fragment of one end in elevation, the other end being removed and the side being seen in edge view. Fig. 6 is a detail plan of some of the strips or panels of the cover detached.

Referring to the drawing by numerals, 1 indicates the sides, and 2, 2 the ends of the crate or box, each of which is preferably formed of relatively thin sheet metal, the latter being provided with right-angled lapping portions 6, which inclose the sides and are connected thereto by turn buttons 3, each of which extends through an aperture in the respective lapping portions 6 and through a slot 5 in the respective side 1, whereby the sides and ends can readily be detached by turning the inner portions of the buttons in position registering the slots 5 and then withdrawing the buttons.

Each side 1 is formed with a groove 9 consisting of an upper longitudinal groove portion, and a lower longitudinal groove portion, these groove portions near one end of the respective side being connected by an arcuate groove portion, so as to form a substantial continuous path or guide-way from a point at one end of the respective side at the lower portion thereof practically throughout the length of the side, curving about the opposite end and back to the first mentioned end of the respective side at the uppermost portion thereof. The groove 9 may be formed in various ways, but, when the sides 1 are of sheet metal, is preferably produced by stamping the metal into shape as clearly indicated in Fig. 5. Each side 1 is also formed with a longitudinal groove 7 and a similar groove 8 parallel therewith and spaced between the groove 7 and groove 9. The groove 7 at one side is, of course, in horizontal alinement with that of the other side, and the two grooves may be considered a pair, and, likewise, the grooves 8 are correspondently disposed and may be considered a pair. A plate or board 10, of appropriate material, such as binders' board is fitted snugly into the pair of grooves 8, so as to form a bottom or supporting plate for the eggs, and the plate 10 is preferably provided with a series of apertures 11 spaced apart to receive and sustain eggs and to serve as pockets therefor. A plate 12, similar in structure to plate 10, is fitted in the pair of grooves 7 and is provided with a series of apertures 13, of a size and location relative to the apertures 11 for accommodating intermediate portions of eggs resting in apertures 11 and extending upwardly through apertures 13.

The two boards or plates 10 and 12 would thus effectively support the eggs in their spaced relation if the box were not subjected to vibration, but any shaking or jarring movement is liable to cause the supported eggs to turn or topple and fall sufficient for two of them to meet with resulting disaster to either or both eggs. To provide against this and other like catastrophies and for other purposes which will become obvious, a cushioning device is caused to engage the upper portions of the eggs, and the said cushioning device preferably consists of a tray 14 formed of a sheet of flexible cardboard or other like substance and having apertures 15 registering with apertures 13 and of a size to receive the upper portions of the eggs and prevent excessive lateral play thereof, the board 14 being provided with a wing or plurality of wings consisting of flaps 16, formed of the material of the board 14. Each of the wings 16 consists of a flange-like strip and is bent from the body of the sheet or board 14 at an angle such that when the upper or free portion of the wing is engaged it will exert a cushioned pressure on the sheet or tray 14, and thereby resist movement of the tray. The wings or flaps 16 are, as is clear from Fig. 3, preferably extended longitudinally of the box, but, as will be obvious, they may be otherwise located if desired, and while the said flaps are shown as consisting of material stamped out of and bent up from the material of tray 14, the said flaps may obviously be otherwise constructed when desired.

A top or cover is provided for the box and consists of a flexible plate formed of a series of panels or strips 17, linked together by hook portions 18, extending from the longitudinal edge of each strip and engaging slots 19 in the respective adjacent panel or strip 17. Each panel or strip 17 preferably is provided with an endwise extension or projection 20 disposed to fit between and be guided by the walls of grooves 9. The plate thus produced is flexible longitudinally and is thus free to slide about the arcuate portion of grooves 9 to and from a closed position, to facilitate effecting which movement one end of the cover plate is provided with a flexible tab 21' and the other end with a like tab 21. When the parts are in the position indicated in Fig. 2, the operator may grasp the tab 21', and drawing the same forwardly, will pull the top or cover plate, consisting of the panels 17, to an open position, the portion of said plate engaged by tab 21 being moved along the lower portions of grooves 9 to the forward end thereof and the portion of the cover plate engaged by tab 21 being thus moved to a position substantially within the extreme upper part of the arcuate portions of grooves 9.

In practice, the eggs are disposed in the box in the manner indicated in Figs. 2 and 3, and the cushioning means consisting of the tray or plate 14 is placed upon the eggs with the upper end portions of the eggs extending through apertures 15. In this position the cushioning wings 16 upstand beyond the plane of the sliding cover, and when the cover is to be drawn forwardly or to its closed position the said flaps must be depressed manually until the cover plate is drawn forwardly above the rear portions of the flaps, and then the cover plate may be rapidly drawn to its closed position as the flaps 16 will be forced beneath the cover plate by contact of the cover plate, which indicates one of the advantages of the longitudinal disposition of the wings 16. When the cover plate is closed, it is in the position indicated in Fig. 2, and the parts are ready for shipment. When the box is delivered and the receiver wishes to empty it, so as to be able to return the empty box, he merely inverts the box, from the position indicated in Fig. 2 and draws the tab 21' forwardly until the cover plate is withdrawn from engagement with wings 16. As the cover plate is being withdrawn, the said wings or flaps 16 will spring outwardly and downwardly, being inverted, and engage the surface on which the box rests, as, for instance, surface 22, so that as soon as the cover plate has been fully withdrawn the tray or plate 14 forms a cushioning support for the eggs, and the box can be lifted vertically upwardly out of the horizontal plane of the eggs and leave them standing on the tray or plate 14 as indicated in Fig. 4.

I claim as my invention.

1. In combination, a container, egg supporting means arranged therein leaving the upper portions of the eggs free, a cushioning sheet engaging the upper portions of the eggs and having upstanding cushioning flaps, and a sliding top adapted to be slid to and from a position engaging the flaps and retaining the cushioning sheet in position.

2. In combination, a container, egg supporting means arranged therein leaving the upper portions of the eggs unsupported, a sliding cover for the container, a sheet having apertures located to receive the upper portions of the eggs, cushioning flaps projecting upwardly from the sheet and extending in the direction of travel of the cover, and a cover adapted for removably engaging the cushioning means.

3. An egg box of the specified class, comprising means for spacing eggs in vertical positions, a removable tray having correspondingly spaced egg holes and resilient wings, and a flexible top-and-bottom sliding lid engaging the wings.

4. In combination, a container, egg supporting means therein adapted to support eggs with the upper portions thereof free, a sheet having apertures adapted to receive the upper portions of the eggs, cushioning means engaging and extending upwardly from the sheet, and a sliding cover adapted to be slid across and into engagement with the cushioning means for retaining the same in place.

5. In combination, a container, a plurality of vertically spaced plates therein, one of said plates having pockets for receiving the lower ends of eggs and another of said plates having apertures to accommodate intermediate portions of eggs, the apertures corresponding in location to the location of the pockets for sustaining the eggs in upright position, a cushion disposed to engage the upper portions of the eggs, and a lid for the container slidable across the cushion for retaining the cushion in position.

In testimony whereof I set my hand hereto in the presence of two witnesses.

ELMER E. YOHO.

Witnesses:
WILLARD EDDY,
MARION McCAFFREY.

Copies of this patent may be obtained for five cents each, by addressing the "Commissioner of Patents, Washington, D. C."